(12) United States Patent
Satou

(10) Patent No.: US 10,666,354 B2
(45) Date of Patent: May 26, 2020

(54) MONITORING SYSTEM AND MONITORING METHOD

(71) Applicant: NEC Corporation, Minato-ku, Tokyo (JP)

(72) Inventor: Yoshirou Satou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/332,045

(22) PCT Filed: Sep. 11, 2017

(86) PCT No.: PCT/JP2017/032619
§ 371 (c)(1),
(2) Date: Mar. 11, 2019

(87) PCT Pub. No.: WO2018/051935
PCT Pub. Date: Mar. 22, 2018

(65) Prior Publication Data
US 2019/0253139 A1    Aug. 15, 2019

(30) Foreign Application Priority Data

Sep. 15, 2016  (JP) ................................ 2016-180629

(51) Int. Cl.
*H04B 10/079* (2013.01)
*H04J 14/02* (2006.01)
*H04B 10/80* (2013.01)

(52) U.S. Cl.
CPC ..... *H04B 10/07955* (2013.01); *H04B 10/079* (2013.01); *H04J 14/02* (2013.01); *H04B 10/80* (2013.01)

(58) Field of Classification Search
CPC ............ H04B 10/07955; H04B 10/079; H04B 10/80; H04J 14/02
See application file for complete search history.

(56) References Cited

U.S. PATENT DOCUMENTS

| 6,839,518 B1 | 1/2005 | Minamimoto et al. |
| 2007/0264013 A1* | 11/2007 | Hasuo ............... H04B 10/032 398/34 |

(Continued)

FOREIGN PATENT DOCUMENTS

| JP | 2001-186107 A | 7/2001 |
| JP | 2002-198912 A | 7/2002 |

(Continued)

OTHER PUBLICATIONS

International Search Report for PCT Application No. PCT/JP2017/032619, dated Nov. 21, 2017.

(Continued)

*Primary Examiner* — Casey L Kretzer

(57) ABSTRACT

A monitoring system for a transmission line that transmits an optical wavelength multiplexed signal between the local station and a remote station, including: a first monitor means for measuring the optical power of an optical signal pertaining to the optical wavelength multiplexed signal transmitted by the local station; a second monitor means for measuring the optical power of an optical signal pertaining to the optical wavelength multiplexed signal received by the local station; and a monitoring control means for transmitting the local station's transponder wavelength information and dummy optical wavelength information, and transmitting the remote station's transponder wavelength information and dummy optical wavelength information.

19 Claims, 10 Drawing Sheets

(56) References Cited

U.S. PATENT DOCUMENTS

| | | | | |
|---|---|---|---|---|
| 2011/0311216 A1* | 12/2011 | Inoue | ................. | H04B 10/0791 |
| | | | | 398/1 |
| 2015/0043919 A1* | 2/2015 | Handelman | ............. | H04J 14/02 |
| | | | | 398/79 |
| 2015/0207583 A1* | 7/2015 | Nakajima | ........... | H04J 14/0212 |
| | | | | 398/79 |
| 2015/0333863 A1* | 11/2015 | Fujita | ............... | H04B 10/07955 |
| | | | | 398/34 |
| 2016/0204875 A1 | 7/2016 | Araki et al. | | |

FOREIGN PATENT DOCUMENTS

| | | | |
|---|---|---|---|
| JP | 2003-124896 | A | 4/2003 |
| JP | 2015-220553 | A | 12/2015 |
| JP | 2016-131273 | A | 7/2016 |

OTHER PUBLICATIONS

English translation of Written opinion for PCT Application No. PCT/JP2017/032619.

* cited by examiner

MONITORING SYSTEM AND MONITORING METHOD

This application is a National Stage Entry of PCT/JP2017/032619 filed on Sep. 11, 2017, which claims priority from Japanese Patent Application 2016-180629 filed on Sep. 15, 2016, the contents of all of which are incorporated herein by reference, in their entirety.

TECHNICAL FIELD

The present invention relates to a monitoring system and a monitoring method, and more particularly, to a monitoring system and a monitoring method for an optical transmission line.

BACKGROUND ART

A technique in which optical signals of main signal light and dummy light are monitored by using an optical channel monitor (OCM) on a transmitting side and a receiving side of submarine line terminal equipment (SLTE) to monitor a failure in a transmission line has been used. Hereinafter, the optical channel monitor is referred to as an OCM and the submarine line terminal equipment is referred to as an SLTE.

As an example of the optical transmission system described in the background art, FIGS. 7 and 8 each show an example of monitoring of an optical signal for an SLTE by using an OCM in a submarine cable system.

FIG. 7 shows a configuration in which an OCM is disposed on a transmitting side of an SLTE and monitors an optical signal. An SLTE 100A in an A-station will be described. On the transmitting side of the SLTE, a MUX 101A multiplexes on optical signals of a transponder TPD-a being main signal light, and dummy light. An output from the MUX 101A is characterized by an optical spectrum as shown in (a) of FIG. 9. An optical wavelength multiplexed signal from the MUX 101A is branched into a main signal path toward a transmission line leading to a B-station, and an optical monitor path toward an OCM 102A. Like in a measurement principle of a general optical spectrum analyzer, the OCM 102A is capable of measuring an optical power by performing an electrical conversion by using a photodetector while causing an optical bandpass filter to sweep within a narrow wavelength slot. In the monitoring of an optical signal by using the OCM 102A described in the background art, like in a WDM measurement mode for the optical spectrum analyzer, peaks and valleys of the optical signal are discriminated by internal calculation processing, and a peak wavelength (a wavelength at which a peak power is detected) and a peak power (a highest power of the optical signal having peaks and valleys) are automatically specified.

When the OCM 102A detects a peak power, it is determined that there is an optical signal. Further, when the OCM 102A detects no peak power, it is determined that there is no optical signal. Information about the presence or absence of the optical signal is transmitted to a monitoring system 110 in the A-station, whereby monitoring of the optical signal on the transmitting side of the SLTE in the A-station is carried out.

On a receiving side of an SLTE, the optical wavelength multiplexed signal input from the transmission line is separated into individual wavelengths by a DEMUX 103B and the optical signal is then received by a transponder TPD-a. Further, a SLTE 100B in the B-station has a configuration similar to that in the A-station. Information about presence or absence of the optical signal measured by an OCM 102B is transmitted to the monitoring system 110 in the A-station through an out-of-band data communication network (DCN).

FIG. 8 shows a configuration in which an OCM is disposed on a receiving side of an SLTE and monitors an optical signal. A transmitting side of an SLTE is similar to that shown in FIG. 7, except for the optical monitor path for the OCM, and thus description thereof is omitted. An SLTE 200B in a B-station will be described. On the receiving side of the SLTE, an optical wavelength multiplexed signal input from a transmission line is branched into a main signal path toward a transponder TPD-a, and an optical monitor path toward an OCM 202B. An optical spectrum on the receiving side of the SLTE is characterized by an optical spectrum as shown in (b) of FIG. 9. An optical signal in the main signal path is separated into individual wavelengths by a DEMUX 203B, and is then received by the transponder TPD-a. An optical signal toward the OCM 202B is specified by monitoring of the optical signal in the OCM 202B described above.

Information about presence or absence of the optical signal is transmitted to the monitoring system 210 in the A-station, and monitoring of the optical signal on the receiving side of the SLTE in the A-station is carried out. Further, the SLTE in the B-station has a configuration similar to that in the A-station, and information about presence or absence of the transponder TPD-a and dummy light measured by the OCM 202B is transmitted to the monitoring system 210 through an out-of-band data communication network (DCN).

Patent Literature 1 (PTL1) relates to an optical transmission system that multiplexes on a plurality of optical signals and transmits and receives the optical signals through an optical fiber cable. PTL1 proposes a technique in which, when the optical signals having respective wavelengths are not output from an optical fiber cable, it is determined that the optical fiber cable is disconnected, and then output of the optical signals is interrupted.

CITATION LIST

Patent Literature

[PTL1] Japanese Patent Application Laid-Open No. 2003-124896

SUMMARY OF INVENTION

Technical Problem

With growth of data communication, communications traffic tends to increase year by year. For that reason, a technique for further increasing a transmission capacity by increasing a transmission speed of a transponder, and by narrowing a wavelength interval and performing multiplexing on optical signals for increasing efficiency of accommodating optical signals is used. The former leads to an increase in a frequency region of an optical spectrum of the transponder. The latter leads to partial overlapping of adjacent optical spectrums and optical wavelength multiplexing at irregular wavelength intervals. An optical spectrum output from the transmitting side of the SLTE and an optical spectrum input to the receiving side of the SLTE are shown in (a) of FIG. 9 and (b) of FIG. 9, respectively. In the monitoring of the optical signal described in the background art, partial overlapping of adjacent optical spectrums makes it difficult to discriminate peaks and valleys of the optical signal, and also makes it difficult to monitor the main signal light and the dummy light from the optical spectrums.

An object of the present invention is to provide a monitoring system and a monitoring method which are capable of properly monitoring a transmission line for transmitting an optical wavelength multiplexed signal.

Solution to Problem

To achieve the above-mentioned object, a monitoring system according to the present invention is a monitoring system for a transmission line for transmitting an optical wavelength multiplexed signal between a local station and an opposed station, and comprises:

a first monitor means for measuring an optical power of an optical signal associated with an optical wavelength multiplexed signal transmitted by the local station; and a monitoring control means for performing monitoring by transmitting transponder wavelength information and dummy optical wavelength information about the local station to the first monitor means, checking an optical power of a wavelength slot of a same wavelength as a wavelength designated in the transponder wavelength information and the dummy optical wavelength information measured by the first monitor means, and checking an optical power of a wavelength slot of a same wavelength as a wavelength designated in the transponder wavelength information and the dummy optical wavelength information, among optical powers of the optical signal associated with an optical wavelength multiplexed signal received by the opposed station.

A monitoring method according to the present invention is a monitoring method for a transmission line for transmitting an optical wavelength multiplexed signal between a local station and an opposed station, and comprises:

transmitting transponder wavelength information and dummy optical wavelength information about the local station to a first monitor means for measuring an optical power of an optical signal associated with an optical wavelength multiplexed signal transmitted by the local station, and checking an optical power of a wavelength slot of a same wavelength as a wavelength designated in the transponder wavelength information and the dummy optical wavelength information measured by the first monitor means; and checking an optical power of a wavelength slot of a same wavelength as a wavelength designated in the transponder wavelength information and the dummy optical wavelength information, among optical powers of the optical signal associated with an optical wavelength multiplexed signal received by the opposed station.

Advantageous Effects of Invention

According to the present invention, it is possible to properly monitor a transmission line for transmitting an optical wavelength multiplexed signal.

Figure 3:
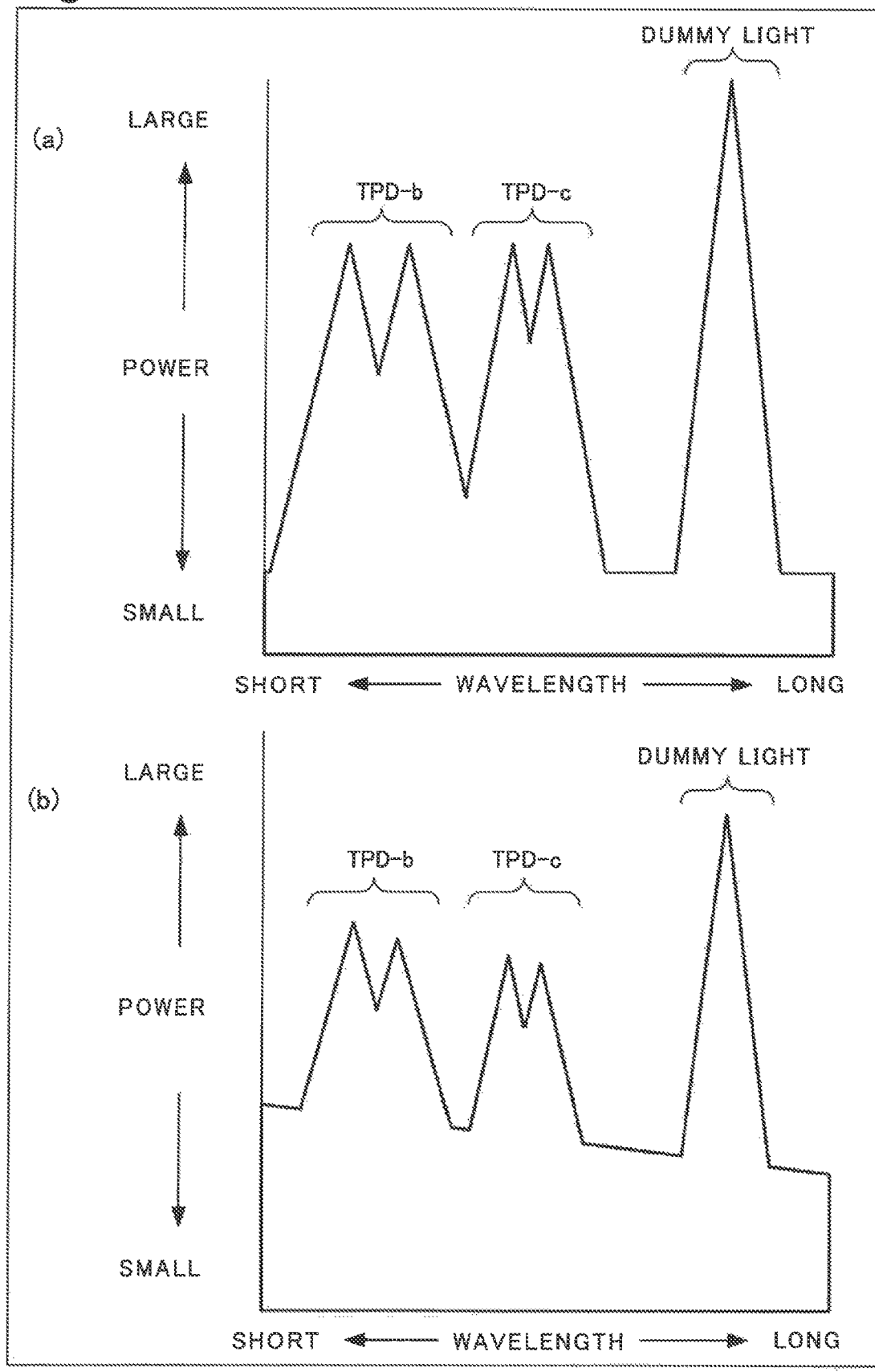
Figure 4:
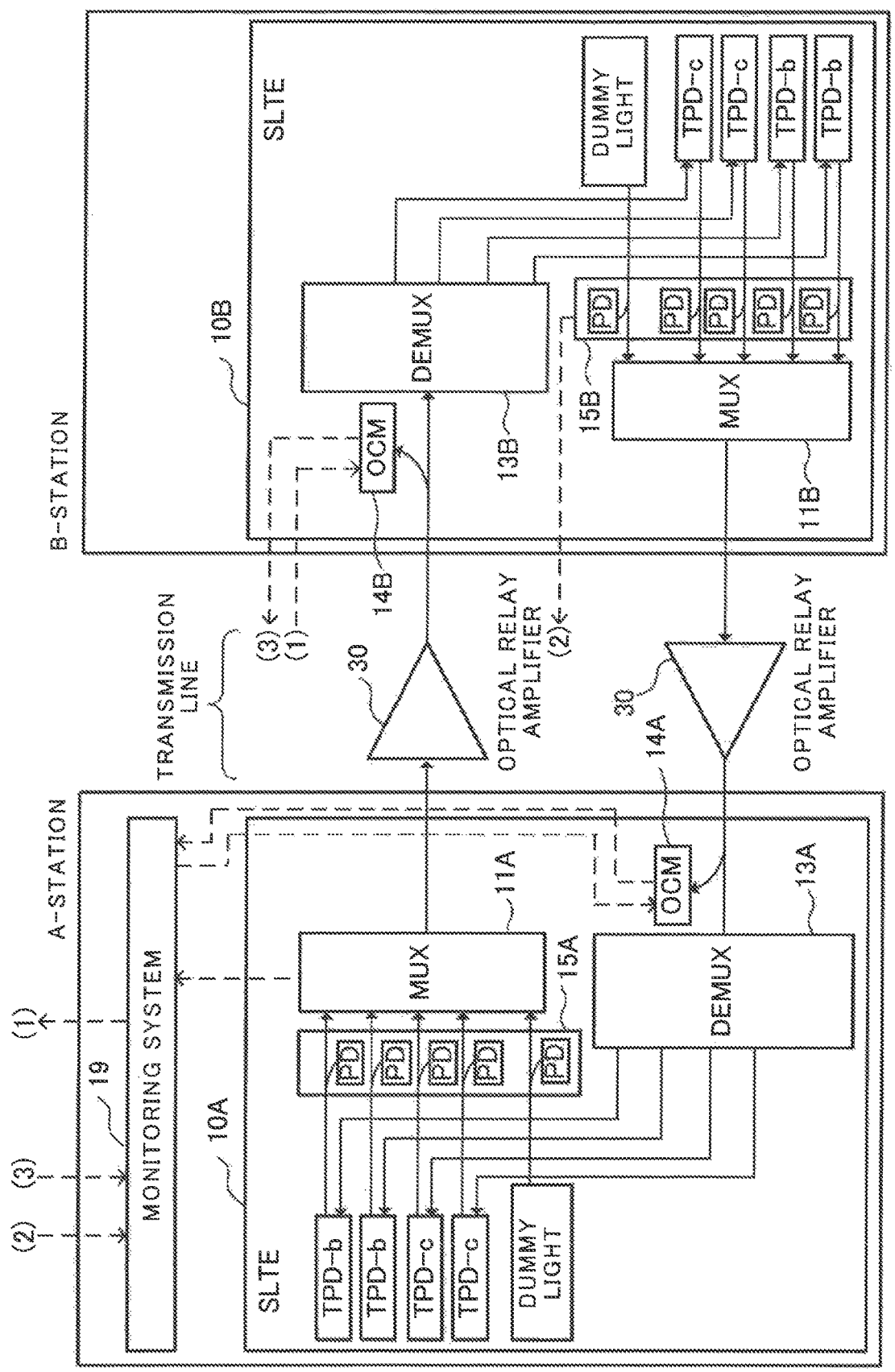
Figure 5:
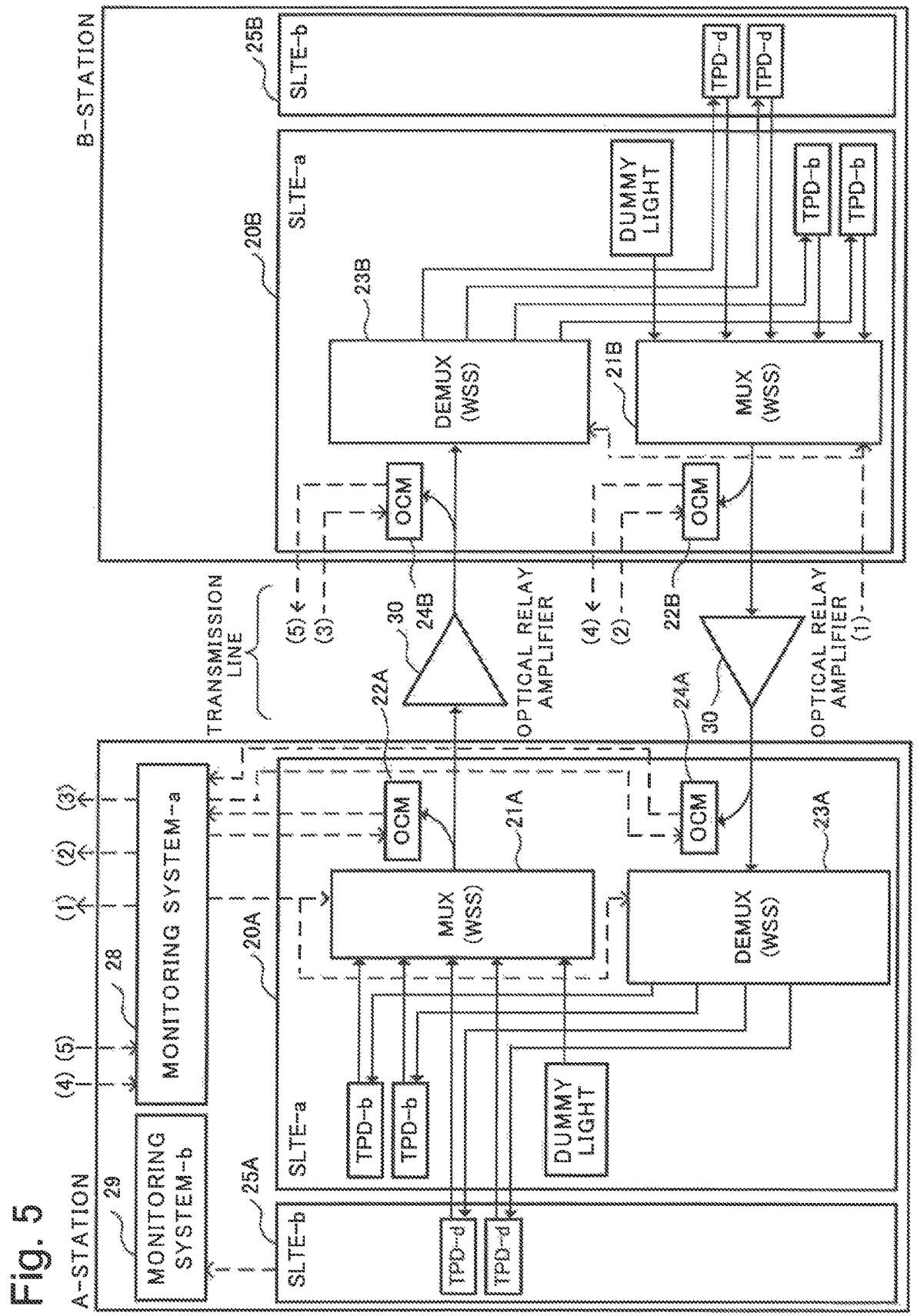
Figure 6:
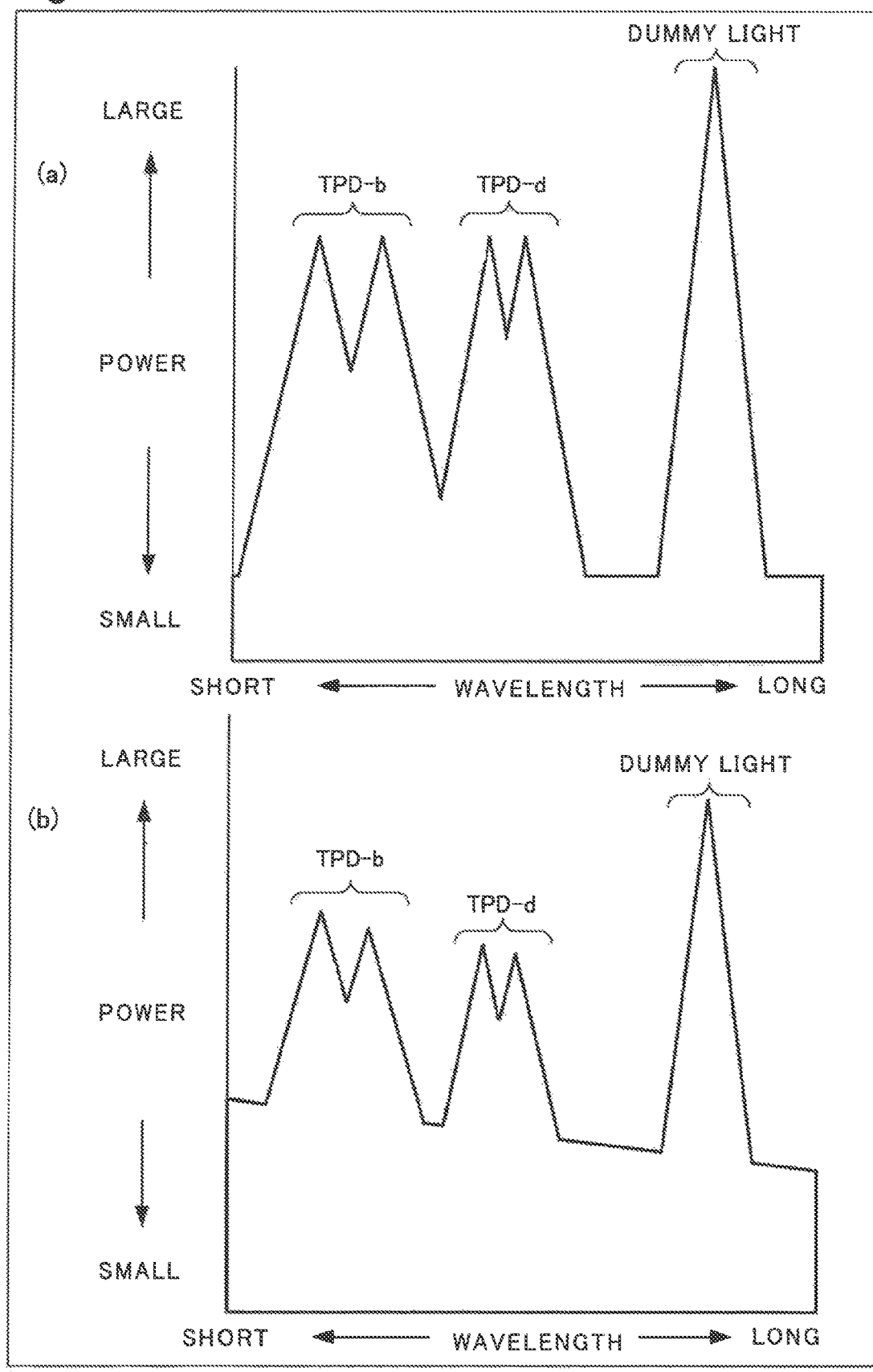
Figure 7:
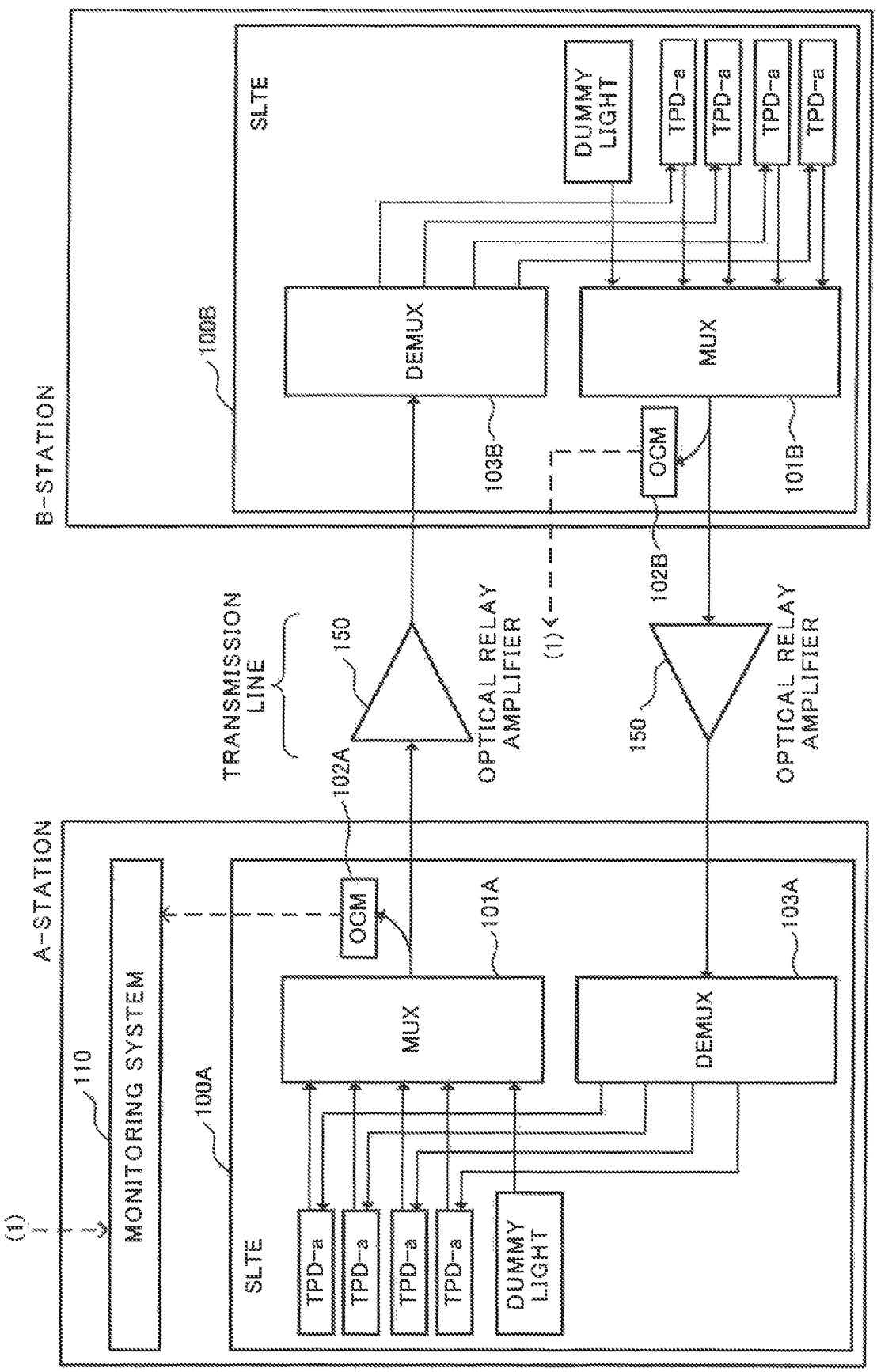
Figure 8:
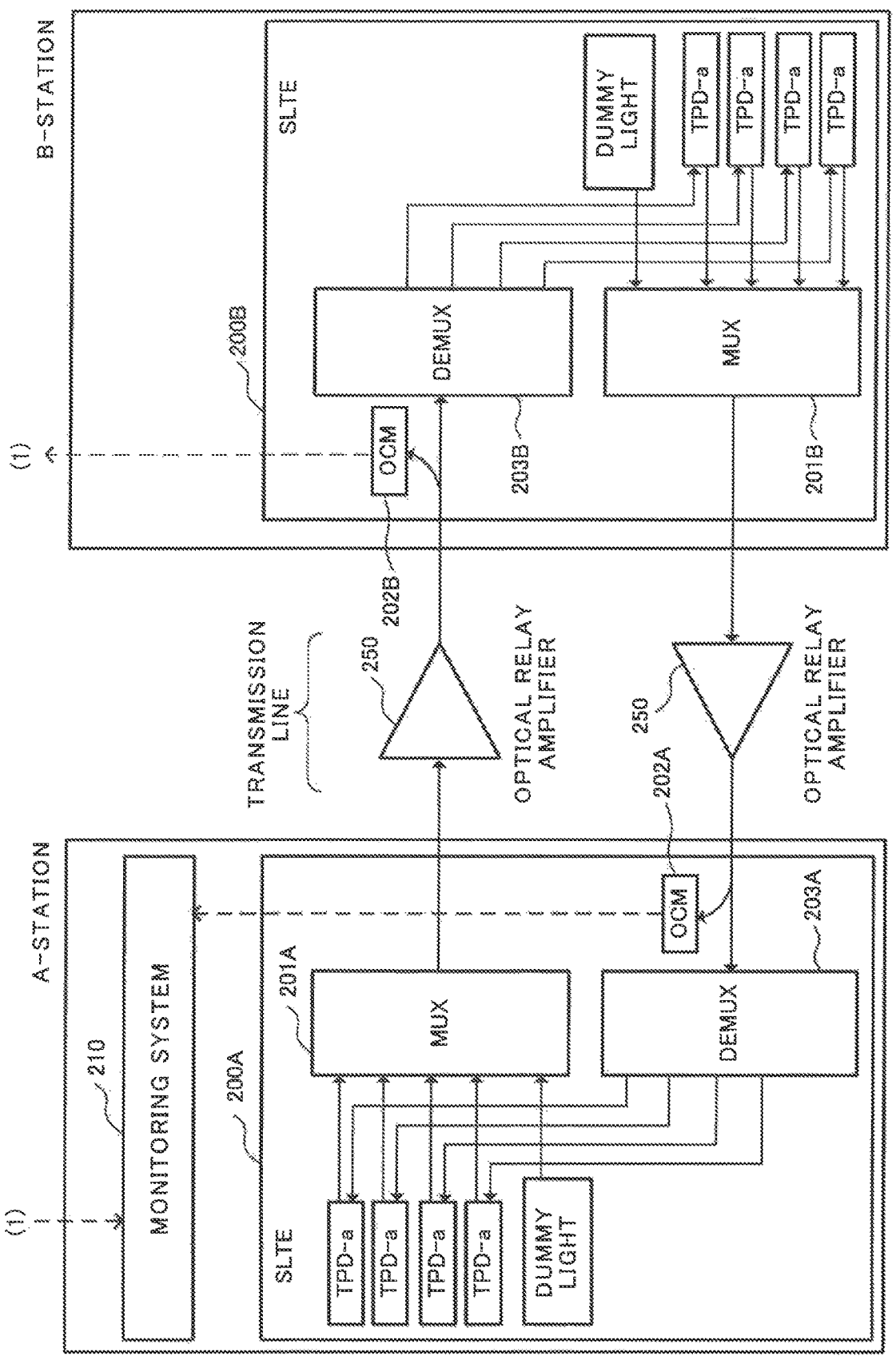
Figure 9:
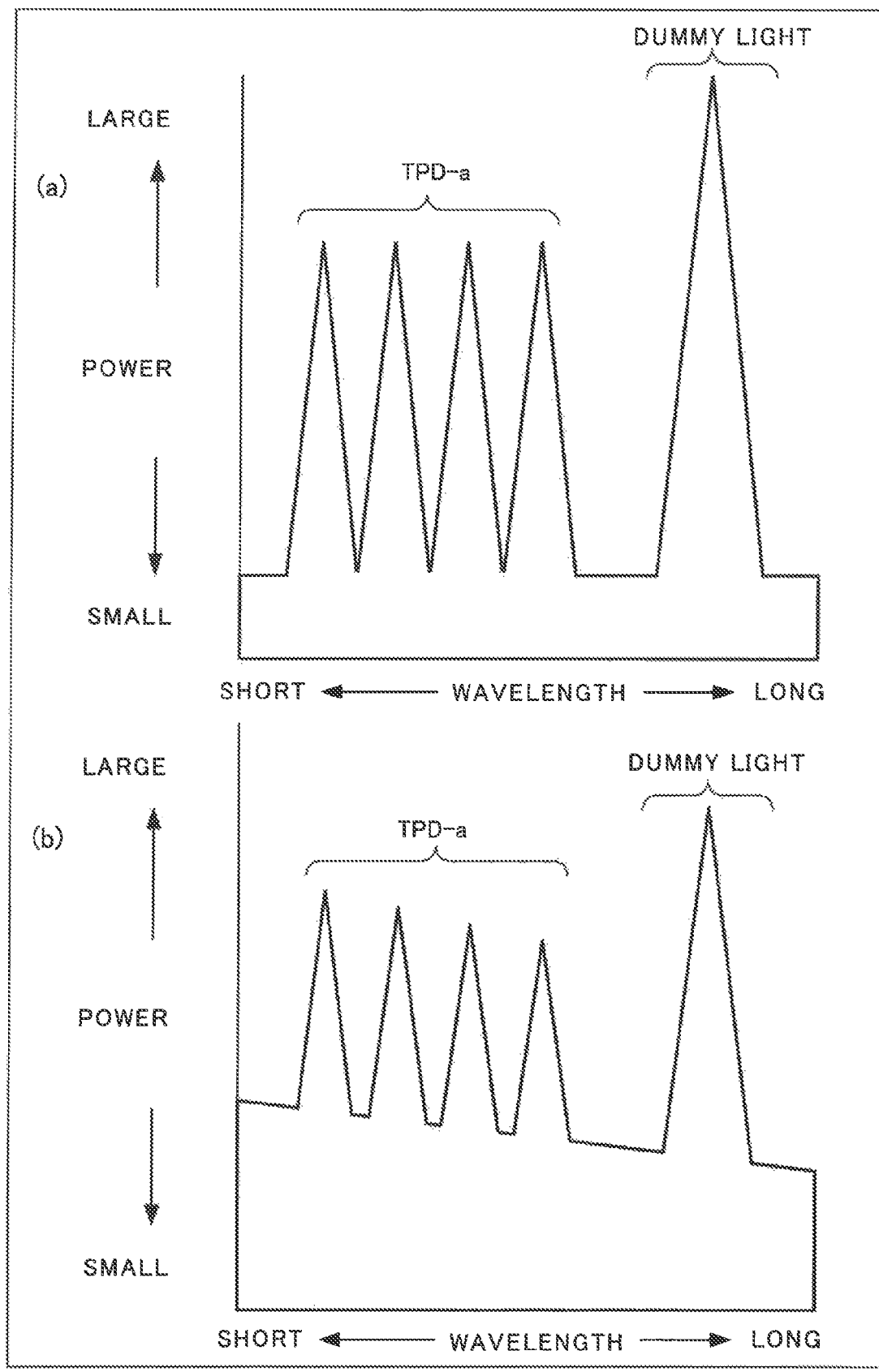
Figure 10:
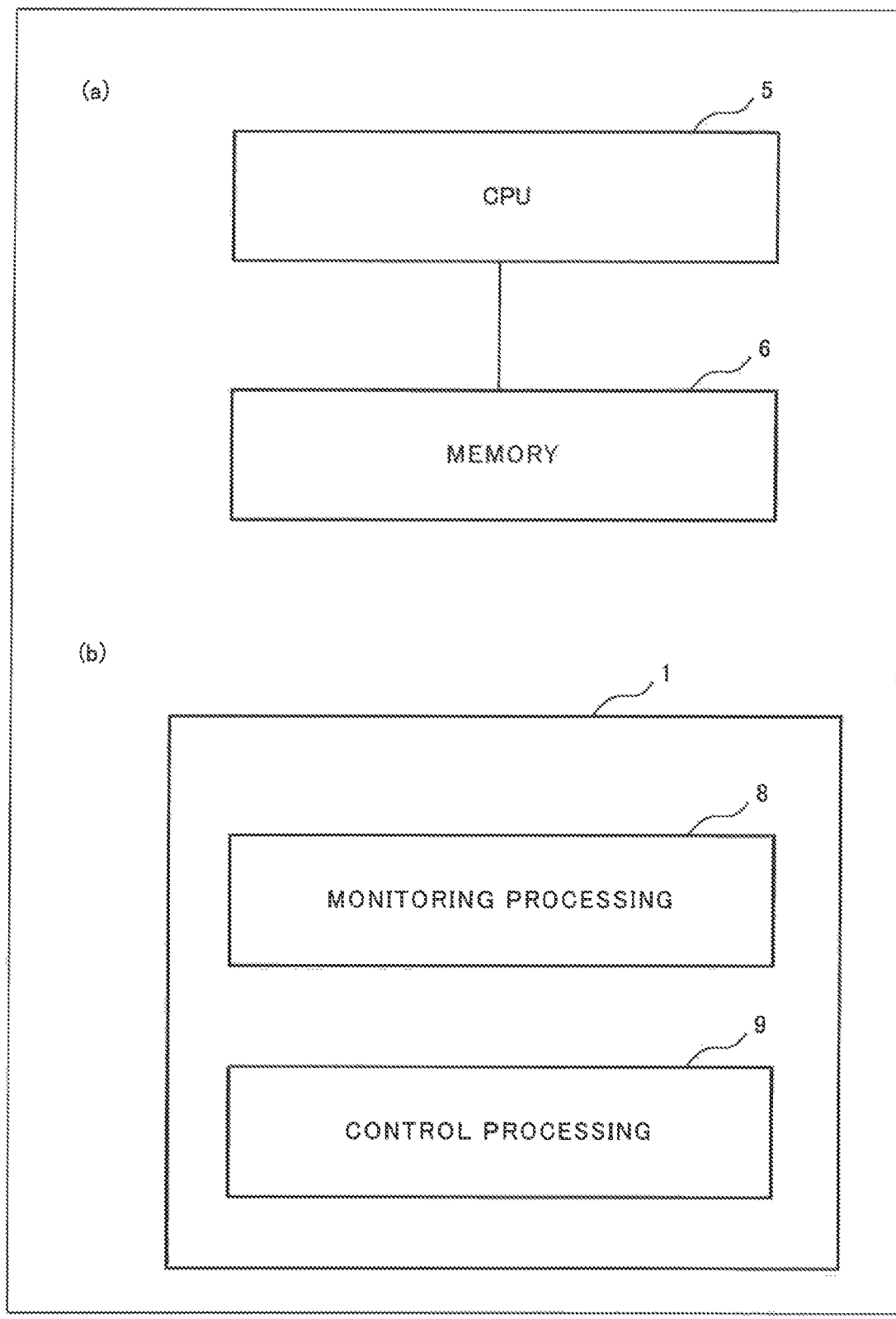

(a) and (b) of FIG. 3 are graphs each showing spectrums of an optical signal and dummy light according to the first example embodiment;

FIG. 4 is a configuration diagram for explaining a monitoring system and a transmission system according to a second example embodiment;

FIG. 5 is a configuration diagram for explaining a monitoring system and a transmission system according to a third example embodiment;

(a) and (b) of FIG. 6 are graphs each showing spectrums of an optical signal and dummy light according to the third example embodiment;

FIG. 7 is a configuration diagram of a monitoring method according to a first background art;

FIG. 8 is a configuration diagram of a monitoring method according to a second background art;

(a) and (b) of FIG. 9 are graphs each showing spectrums of an optical signal and dummy light according to the background art; and (a) of FIG. 10 is a block diagram showing another configuration example of a monitoring system according to an example embodiment, and (b) of FIG. 10 is a block diagram showing still another configuration example of the monitoring system.

EXAMPLE EMBODIMENT

Prior to specifically describing preferred example embodiments of the present invention, an outline of the present invention and an example embodiment of the most generic concept thereof will be described. The present invention can be applied to monitoring of an optical signal in an optical transmission system, for example, a submarine cable system, and is capable of monitoring a failure in a transmission line.

Example Embodiment of Most Generic Concept

Figure 1:
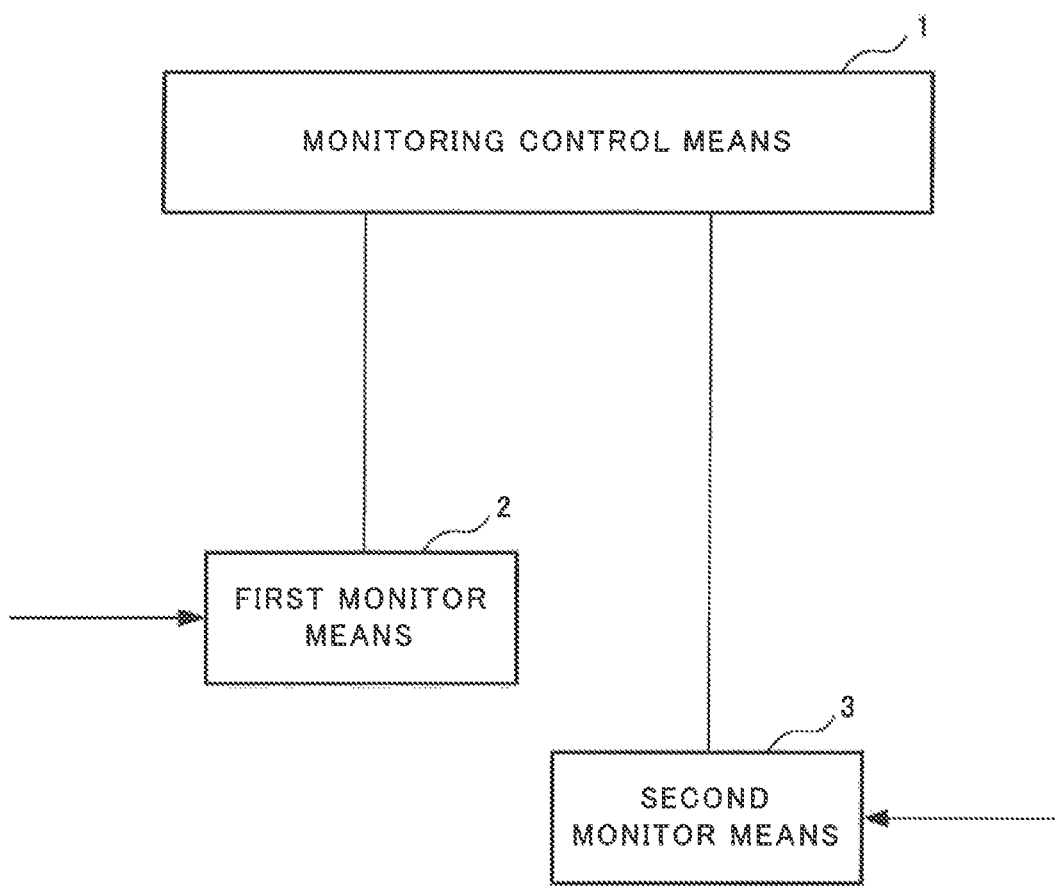
FIG. 1 is a block diagram of a monitoring system according to an example embodiment of the most generic concept.

A monitoring system and a monitoring method according to an example embodiment of the most generic concept of the present invention will be described. FIG. 1 is a block diagram of the monitoring system according to the example embodiment of the most generic concept.

The monitoring system shown in FIG. 1 includes a monitoring control means 1, a first monitor means 2, and a second monitor means 3. The monitoring system shown in FIG. 1 is a monitoring system for a transmission line for transmitting an optical wavelength multiplexed signal between a local station and an opposed station, and is provided in, for example, the local station. The terms "local station" and "opposed station" are determined based on a relative concept. Accordingly, the monitoring system shown in FIG. 1 may be provided in the opposed station.

The monitoring control means 1 transmits transponder wavelength information and dummy optical wavelength information about the local station to the first monitor means 2. The first monitor means 2 measures, by an optical spectrum measurement function, an optical power of a wavelength slot of the same wavelength as a wavelength designated in the transponder wavelength information and the dummy optical wavelength information, and transmits the measurement result to the monitoring control means 1. The monitoring control means 1 checks a measurement value of the optical power of the wavelength slot of the same wavelength as the designated wavelength, which is the measurement result, and monitors presence or absence of an optical signal on a transmitting side of an SLTE.

The monitoring control means 1 transmits transponder wavelength information and dummy optical wavelength information about the opposed station to the second monitor means 3. The second monitor means 3 measures, by the optical spectrum measurement function, an optical power of a wavelength slot of the same wavelength as the wavelength designated in the transponder wavelength information and the dummy optical wavelength information, and transmits the measurement result to the monitoring control means 1. The monitoring control means 1 checks a measurement value of the optical power of the wavelength slot of the same wavelength as the designated wavelength, which is a measurement result, and monitors presence or absence of an optical signal on a receiving side of the SLTE.

According to the configuration described above, the transponder wavelength information and the dummy optical wavelength information from the monitoring control means 1 can be obtained, and presence or absence of a signal of each wavelength can be detected by using the first monitor means 2 and the second monitor means 3. Consequently, the transmission line for transmitting the optical wavelength multiplexed signal can be properly monitored. More specific example embodiments will be described below.

First Example Embodiment

Figure 2:
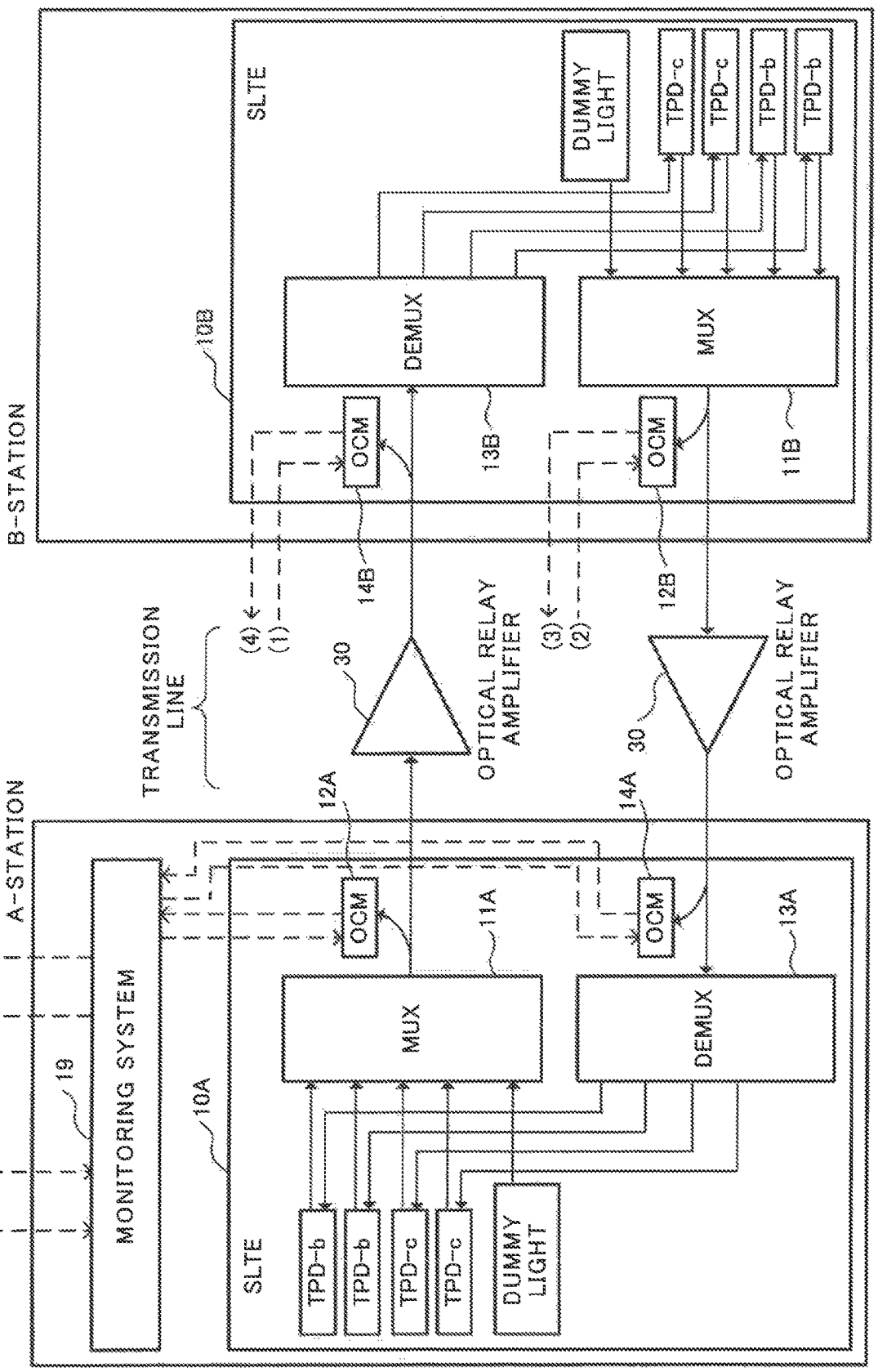
FIG. 2 is a configuration diagram for explaining a monitoring system and a transmission system according to a first example embodiment.

A monitoring system and a monitoring method according to a first example embodiment of the present invention will be described. FIG. 2 is a configuration diagram for explaining the monitoring system and a transmission system according to the first example embodiment.

Referring to FIG. 2, SLTEs disposed in a local station and an opposed station, respectively, are connected by a point-to-point transmission system.

Hereinafter, the local station is referred to as an A-station and the opposed station is referred to as a B-station.

The local station includes an SLTE 10A and a monitoring system 19. The opposed station includes an SLTE 10B. The A-station and the B-station are connected to each other via a transmission line. One example of the transmission line is an optical fiber cable. An optical relay amplifier 30 that amplifies an optical signal is inserted in the transmission line.

The SLTE 10A in the A-station includes a plurality of transponders TPD-b, a plurality of transponders TPD-c, a multiplexing unit 11A (MUX 11A), a separation unit 13A (DEMUX 13A), an OCM 12A as an example of a first monitor means, and an OCM 14A as an example of a second monitor means.

Each of the plurality of transponders TPD-b and TPD-c of the SLTE 10A converts each input electrical signal into an optical signal of each wavelength (a wavelength optical signal), and outputs the converted optical signal to the multiplexing unit 11A (MUX 11A). Further, each of the plurality of transponders TPD-b and TPD-c converts an optical signal of the wavelength (wavelength optical signal) that is output from the separation unit 13A (DEMUX 13A) into an electrical signal.

The multiplexing unit 11A (MUX 11A) inputs the wavelength optical signals from the plurality of transponders TPD-b and TPD-c and dummy light from a dummy light source, and outputs an optical wavelength multiplexed signal to the transmission line.

The separation unit 13A (DEMUX 13A) inputs the optical wavelength multiplexed signal from the transmission line, and outputs an optical signal of the wavelength (wavelength optical signal) to each of the plurality of transponders TPD-b and TPD-c.

In a wavelength division multiplexing technique used in the optical communication system, one carrier is generally arranged for each channel at constant center frequency intervals. Such a channel arrangement is defined as a frequency grid. The frequency grid in which the center frequency interval of channels is, for example, 50 GHz, is hereinafter referred to as a 50 GHz-grid.

First, a transmitting side of the SLTE will be described. Optical signals of two waves from the transponder TPD-b that generates a 50 GHz-grid signal, two waves from the transponder TPD-c that generates a 37.5 GHz-grid signal, and one wave of 50 GHz-grid dummy light are output at different center wavelengths. The dummy light described herein refers to power correction light for preventing the total power obtained after optical multiplexing from being fluctuated when the number of transponders may be increased or decreased in the future. A means for implementing the dummy light is not limited, and a light source obtained by clipping an Amplified Spontaneous Emission (ASE) light source by using a filter, a Distributed Feedback (DFB) laser, a semiconductor laser, or the like may be used.

These optical signals are multiplexed as an optical wavelength multiplexed signal by the multiplexing unit 11A (MUX 11A), and an optical spectrum as shown in (a) of FIG. 3 is obtained. In this case, however, it is assumed that this optical spectrum maintains the output power from each transponder at a constant value, and a pre-emphasis adjustment to obtain an optimum value is not made on a light receiving characteristic of the main signal.

The optical wavelength multiplexed signal from the multiplexing unit 11A (MUX 11A) is branched into a main signal path toward the transmission line and an optical monitor path toward the OCM 12A on the transmitting side. The OCM 12A on the transmitting side receives transponder wavelength information and dummy optical wavelength information about the A-station from the monitoring system 19 at the time of start-up of the SLTE and at the time of expanding the wavelength.

Like in the measurement principle of a general optical spectrum analyzer, the OCM 12A is capable of measuring an optical power by separating an optical signal into each wavelength while causing an optical bandpass filter to sweep within a narrow wavelength slot, and performing an electrical conversion of the separated optical signal by using a photodetector. By this optical spectrum measurement function, the optical power measurement value of the wavelength slot of the same wavelength as the designated wavelength received from the monitoring system 19 is checked.

When this measurement value is greater than an optical output loss alarm threshold set in the OCM 12A on the transmitting side, it is determined that there is an optical signal. Further, when this measurement value is less than or equal to the optical output loss alarm threshold, it is determined that there is no optical signal. It is assumed that this optical output loss alarm threshold may be an optical power absolute value, or may be a relative value from the optical power measurement value in an accurate state. Then, information about presence or absence of a transponder and dummy light is transmitted to the monitoring system 19 from the OCM 12A on the transmitting side, whereby monitoring of the optical signal on the transmitting side of the SLTE in the A-station is carried out.

Next, a receiving side of the SLTE will be described. In the optical spectrum on the receiving side of the SLTE, the peak power of the optical signal is not maintained at a constant value as shown in (b) of FIG. 3 due to the effect of the wavelength dependence of the transmission line and the optical relay amplifier 30 and noise in the optical relay amplifier 30, and an Optical Signal to Noise Ratio (OSNR) is smaller than that on the transmitting side. The optical wavelength multiplexed signal input from the transmission line is branched into a main signal path toward the transponders TPD-b and TPD-c and an optical monitor path toward an OCM 14B on the receiving side. The optical signal in the main signal path is separated into individual wavelengths by a separation unit 13B (DEMUX 13B), and is then received by the transponders TPD-b and TPD-c.

The OCM 14B on the receiving side receives transponder wavelength information and dummy optical wavelength information about the B-station from the monitoring system 19 at the time of start-up of the SLTE and at the time of expanding the wavelength. By the optical spectrum measurement function of the OCM 14B, the optical power measurement value of the wavelength slot of the same wavelength as the designated wavelength received from the monitoring system 19 is checked.

When this measurement value is greater than an optical input interruption alarm threshold set in the OCM 14B on the receiving side, it is determined that there is an optical signal. Further, when this measurement value is less than or equal to the optical input interruption alarm threshold, it is determined that there is no optical signal. This optical input interruption alarm threshold may be an optical power absolute value, or may be a relative value from the optical power measurement value in the accurate state. Then, information about presence or absence of a transponder and dummy light from the OCM 14B on the receiving side is transmitted to the monitoring system 19, whereby, monitoring of the optical signal on the receiving side of the SLTE in the A-station is carried out. Further, the SLTE in the B-station has a configuration similar to that in the A-station. Information about presence or absence of the transponder and dummy light measured by the OCM 12B on the transmitting side and the OCM 14B on the receiving side is transmitted to the monitoring system 19 through an out-of-band data communication network (DCN).

Further details about the OCMs including the OCM 12A, the OCM 12B, the OCM 14A, the OCM 14B, and the like will be given. Each OCM performs sampling at some points (wavelengths) of an optical spectrum to acquire an optical level at each point. A peak level and a bottom level are detected from the acquisition result, and a center wavelength and a bandwidth of a wavelength signal are recognized. Accordingly, a spectrum as shown in FIG. 9 according to the background art can be detected. However, in spectrums shown in (a) or (b) of FIG. 3, the difference between a peak and a bottom becomes small, whereby it becomes difficult to detect. Therefore, wavelength information for enabling accurate detection is used and the OCM 12A and the OCM 14A receive wavelength information about the designated wavelength from the monitoring system 19, and checks the optical power measurement value of the wavelength slot of the same wavelength as the designated wavelength received from the monitoring system 19.

According to this example embodiment, the OCM 12A and the OCM 14A obtain the transponder wavelength information and the dummy optical wavelength information from the monitoring system 19, and check the optical power measurement value of the wavelength slot of the same wavelength as the designated wavelength received from the monitoring system 19. Consequently, presence or absence of a signal of each wavelength can be detected by using the OCMs, and the transmission line for transmitting the optical wavelength multiplexed signal can be properly monitored.

Second Example Embodiment

Next, a monitoring system and a monitoring method according to a second example embodiment of the present invention will be described. FIG. 4 is a configuration diagram for explaining the monitoring system and the transmission system according to the second example embodiment. Elements similar to those of the first example embodiment are denoted by the same reference numerals, and detailed descriptions thereof are omitted.

A transmitting side of an SLTE will be described. Optical signals of two waves from the transponder TPD-b that generates a 50 GHz-grid signal, two waves from the transponder TPD-c that generates a 37.5 GHz-grid signal, and one wave of 50 GHz-grid dummy light are output at different center wavelengths. These optical signals are multiplexed as an optical wavelength multiplexed signal by the multiplexing unit 11A (MUX 11A) through an optical power monitor device 15A, and an optical spectrum as shown in (a) of FIG. 3 is obtained. The optical power monitor device 15A monitors an optical output from each of the transponders TPD-b and TPD-c. The optical power monitor device 15A is configured to, for example, include an optical branching unit used to perform branching at a ratio of 10:1 or the like, and a photoelectric converter such as a photodiode (PD). The optical wavelength multiplexed signal from the multiplexing unit 11A (MUX 11A) is headed toward the transmission line.

In this example embodiment, the optical power monitor device 15A having a MUX input port measures powers of transponders TPD-b and TPD-c and dummy light. The optical power monitor device 15A and the transponder wavelength information are associated on a one-to-one basis by the monitoring system.

When this measurement value is greater than the optical output loss alarm threshold set in the optical power monitor device 15A, it is determined that there is an optical signal. Further, when this measurement value is less than or equal to the optical output loss alarm threshold, it is determined that there is no optical signal. This optical output loss alarm threshold may be an optical power absolute value, or may be a relative value from the optical power measurement value in the accurate state. Then, information about presence or absence of a transponder and dummy light is transmitted to the monitoring system 19 from the optical power monitor device 15A, whereby monitoring of the optical signal on the transmitting side of the SLTE in the A-station is carried out. A receiving side of an SLTE is similar to that of the first example embodiment. Further, the SLTE in a B-station has a configuration similar to that in the A-station. Information about presence or absence of a transponder and dummy light measured by an optical power monitor device 15B on the transmitting side and the OCM 14B on the receiving side is transmitted to the monitoring system 19 through the out-of-band Data Communication Network (DCN).

In this example embodiment, presence or absence of a signal of each wavelength is detected by the OCM 14B on the receiving side of the SLTE in the B-station, and presence or absence of a signal of each wavelength is detected by the OCM 14A on the receiving side of the LETE in the A-station. When an optical amplifier is included in the transmission line, ASE light from the optical amplifier reaches a reception end in a signal interruption state. The power (average value) of this ASE light is the same as the power (average value) of signal light. For that reason, in detecting the average value of the optical power (PD), it is impossible to distinguish signal light from ASE light.

Since the OCM can detect a peak of a signal, the peak can be detected in the case of signal light, and thus the signal light can be discriminated.

Therefore, in this example embodiment, presence or absence of a signal of each wavelength is detected by the OCM 14B on the receiving side of the SLTE in the B-station, and presence or absence of a signal of each wavelength is detected by the OCM 14A on the receiving side of the SLTE in the A-station.

According to this example embodiment, like in the first example embodiment, the OCM 14A and the OCM 14B obtain the transponder wavelength information and the dummy optical wavelength information from the monitoring system 19, and check the optical power measurement value of the wavelength slot of the same wavelength as the designated wavelength received from the monitoring system 19. Consequently, presence or absence of a signal of each wavelength can be detected by using the OCMs, and the transmission line for transmitting the optical wavelength multiplexed signal can be properly monitored.

Further, in this example embodiment, information about presence or absence of a transponder and dummy light is transmitted to the monitoring system 19 from the optical power monitor device 15A, whereby, monitoring of the optical signal on the transmitting side of the SLTE in the A-station can be carried out. Furthermore, in this example embodiment, information about presence or absence of a transponder and dummy light is transmitted to the monitoring system 19 from the optical power monitor device 15B, whereby, monitoring of the optical signal on the transmitting side of the SLTE in the B-station can be carried out.

Third Example Embodiment

Next, a monitoring system and a monitoring method according to a third example embodiment of the present invention will be described. FIG. 5 is a configuration diagram for explaining the monitoring system and a transmission system according to the third example embodiment. This example embodiment is an example of application to an optical transmission system when another transponder supplier, which is not subordinate to the monitoring system of an original supplier, expands the wavelength.

Herein, a monitoring system installed by the original supplier in an A-station is referred to as a monitoring system-a 28, and an SLTE thereof is referred to as an SLTE-a 20A. Further, a monitoring system installed by another transponder supplier in the A-station is referred to as a monitoring system-b 29, and an SLTE thereof is referred to as an SLTE-b 25A. An SLTE installed by the original supplier in a B-station is referred to as an SLTE-a 20B, and an SLTE installed by another transponder supplier is referred to as an SLTE-b 25B.

A transmitting side of the SLTE will be described. Optical signals of two waves from a transponder TPD-b that generates a 50 GHz-grid signal for the original supplier, two waves from a transponder TPD-d that generates a 37.5 GHz-grid signal for the transponder supplier, and one wave of 50 GHz-grid dummy light for the original supplier are output at different center wavelengths. In the following description, it is assumed that components other than the monitoring system-b 29 and the transponder TPD-d are installed by the original supplier.

These optical signals are multiplexed as an optical wavelength multiplexed signal by a multiplexing unit 21A (MUX 21A), and an optical spectrum as shown in (a) of FIG. 6 is obtained. An optical wavelength multiplexed signal from the MUX 21A is branched into a main signal path toward the transmission line and an optical monitor path toward an OCM 22A on the transmitting side. The MUX 21A and the OCM 22A on the transmitting side receive transponder wavelength information (filter wavelength information) and dummy optical wavelength information about the A-station from the monitoring system-a 28 at the time of start-up of the SLTE-a 20A and at the time of expanding the wavelength.

It is assumed that the MUX 21A according to this example embodiment is a wavelength selective switch (WSS), and has an input side functioning as an active filter, and the active filter can be controlled in such a way as to have a filter shape that transmits signals in accordance with the transponder wavelength information from the monitoring system-a 28. When there is no transponder wavelength information, the active filter of the MUX 21A is in a closed state where the signals cannot be transmitted. In other words, when the transponder wavelength information is obtained from the monitoring system-a 28, the active filter of the MUX 21A is controlled in such a way as to transmit signals.

Like in the measurement principle of a general optical spectrum analyzer, the OCM 22A is capable of measuring an optical power by separating an optical signal into each wavelength while causing an optical bandpass filter to sweep within a narrow wavelength slot, and performing an electrical conversion of the separated optical signal by using a photodetector. By this optical spectrum measurement function, the optical power measurement value of the wavelength slot of the same wavelength as the designated wavelength received from the monitoring system-a 28 is checked. When this measurement value is greater than the optical output loss alarm threshold set in the OCM 22A on the transmitting side, it is determined that there is an optical signal. Further, when this measurement value is less than or equal to the optical output loss alarm threshold, it is determined that there is no optical signal. This optical output loss alarm threshold may be an optical power absolute value, or may be a relative value from the optical power measurement value in the accurate state. Then, information about presence or absence of a transponder and dummy light is transmitted to the monitoring system-a 28 from the OCM 22A on the transmitting side, whereby monitoring of the optical signal on the transmitting side of the SLTE-a 20A in the A-station is carried out.

Next, a receiving side of the SLTE will be described. The optical spectrum on the receiving side of the SLTE-a 20A is obtained as shown in (b) of FIG. 6. The optical wavelength multiplexed signal input from the transmission line is branched into a main signal path toward the transponders TPD-b and TPD-d and an optical monitor path toward an OCM 24B on the receiving side.

The optical signal in the main signal path is separated into individual wavelengths by a separation unit 23B (DEMUX 23B), and is received by the transponders TPD-b and TPD-d. It is assumed that the DEMUX 23B is a WSS and has an output side functioning as an active filter, and is capable of controlling the active filter in such a way as to have a filter shape that transmits signals in accordance with the transponder wavelength information from the monitoring system-a 28. When there is no transponder wavelength information, the active filter of the DEMUX 23B is in a closed state where the signal cannot be transmitted.

The OCM 24B on the receiving side receives the transponder wavelength information and the dummy optical wavelength information about the B-station from the monitoring system at the time of start-up of the SLTE-a 20A and at the time of expanding the wavelength. By the optical spectrum measurement function of the OCM 24B, the optical power measurement value of the wavelength slot of the same wavelength as the designated wavelength received from the monitoring system-a 28 is checked.

When this measurement value is greater than the optical input interruption alarm threshold set in the OCM 24B on the receiving side, it is determined that there is an optical signal. Further, when this measurement value is less than or equal to the optical input interruption alarm threshold, it is determined that there is no optical signal. This optical input interruption alarm threshold may be an optical power absolute value, or may be a relative value from the optical power measurement value in the accurate state. Then, information about presence or absence of a transponder and dummy light is transmitted to the monitoring system-a 28 from the OCM 24B on the receiving side, whereby monitoring of the optical signal on the receiving side of the SLTE-a 20A in the A-station is carried out. Further, the SLTE in the B-station has a configuration similar to that in the A-station, and information about presence or absence of the transponder and dummy light measured by the OCM 22B on the transmitting side and the OCM 24B on the receiving side is transmitted to the monitoring system-a 28 through the out-of-band data communication network (DCN).

According to this example embodiment, the OCM 22A and an OCM 24A obtain the transponder wavelength information and the dummy optical wavelength information from the monitoring system-a 28, and check the optical power measurement value of the wavelength slot of the same wavelength as the designated wavelength received from the monitoring system-a 28. Consequently, presence or absence of a signal of each wavelength can be detected by using the OCMs, and the transmission line for transmitting the optical wavelength multiplexed signal can be properly monitored.

Further, according to this example embodiment, even in the case of transmission in which a transponder of a supplier different from the original supplier is accommodated and wavelength multiplexing is performed, presence or absence of a signal of each wavelength can be detected by using the OCMs, and the transmission line for transmitting the optical wavelength multiplexed signal can be properly monitored.

This example embodiment is effective in the case of transmission in which a transponder of a supplier (non-original supplier) different from the original supplier is accommodated and wavelength multiplexing is performed. The monitoring system-a 28 is capable of performing control in such a manner that signals are not transmitted until wavelength information about another supplier (non-original supplier) is obtained, and signals are transmitted only after the wavelength information is obtained. Thus, the wavelength in the system can be managed even when the transponder of another supplier (non-original supplier) is accommodated.

Fourth Example Embodiment

Next, a monitoring system and a monitoring method according to a fourth example embodiment of the present invention will be described. This example embodiment implements detection of a failure in a transmission line by using the above-described example embodiments.

In the monitoring system and the monitoring method according to each of the example embodiments described above, it is assumed that the transmission line is monitored both on the transmitting side and the receiving side of the transmission line. In the local station and the opposed station, the wavelength spectrum on the transmitting side is compared with the wavelength spectrum on the receiving side, thereby making it possible to detect a failure in the transmission line.

For example, a failure in the transmission line can be monitored based on a transmission line failure condition in which one or more transmitted optical signals from the SLTE 10A in the A-station shown in FIGS. 2 and 4 are present and none of the optical signals received by the SLTE 10B in the B-station are present. Further, a failure in the transmission line can be monitored based on a transmission line failure condition in which one or more transmitted optical signals from the SLTE-a 20A in the A-station shown in FIG. 5 are present and none of the optical signals received by the SLTE-a 20B in the B-station are present.

Other Example Embodiment

The monitoring systems according to the example embodiments of the present invention described above can also be implemented by an information processing device capable of executing a program for implementing the configuration and operation. This program can be distributed in the market in the form of a computer-readable recording medium. The functions of this example embodiment can be implemented through software by loading the program recorded on the recording medium and executing the program by the information processing device.

(a) of FIG. 10 is a block diagram showing another configuration example of the monitoring system according to an example embodiment, and (b) of FIG. 10 is a block diagram showing still another configuration example of the monitoring system.

The information processing device shown in (a) of FIG. 10 includes a CPU 5 and a memory 6. The monitoring system according to each of the example embodiments of the present invention described above can be implemented by the information processing device with this configuration. Specifically, the monitoring system may be configured such that a program is loaded into the CPU 5 to cause monitoring processing 8 and control processing 9 shown in (b) of FIG. 10 to be executed.

The control processing 9 includes processing for transmitting transponder wavelength information and dummy optical wavelength information about a local station to the first monitor means for measuring an optical power of an optical signal associated with an optical wavelength multiplexed signal transmitted by the local station, and processing for transmitting transponder wavelength information and dummy optical wavelength information about an opposed station to the second monitor means for measuring an optical power of an optical signal associated with an optical wavelength multiplexed signal received by the local station.

The monitoring processing 8 includes processing for checking an optical power of a wavelength slot of the same wavelength as a wavelength specified in transponder wavelength information and dummy optical wavelength information measured by the first monitor means, and processing for checking an optical power of a wavelength slot of the same wavelength as a wavelength specified in transponder wavelength information and dummy optical wavelength information measured by the second monitor means.

A program for causing such processing to be executed can be distributed in the market in the form of a recording medium on which the program is recorded. This program can be distributed in the market in the form of a general-purpose semiconductor recording device, such as a Compact Flash (registered mark) (CF) and a Secure Digital (SD), a magnetic recording medium such as a flexible disk, or an optical recording medium such as a Compact Disc Read Only Memory (CD-ROM).

Although preferred example embodiments of the present invention have been described above, the present invention is not limited to these. For example, although monitoring of a transmission line both on the transmitting side and the receiving side thereof has been mainly described above, this is not essential. However, monitoring of a transmission line both on the transmitting side and the receiving side thereof may lead to an increase in the application range of monitoring results, and therefore, the monitoring can be used for detecting a failure in the transmission line, for example. Various modifications can be made within the scope of the invention described in the claims, and such modifications are also included in the scope of the present invention, as a matter of course.

The example embodiments of the present invention can be summarized as follows.

According to an example embodiment of the present invention, in an optical signal monitor means of a submarine cable system, transponder wavelength information and dummy optical wavelength information about the local station are transmitted to the OCM on the transmitting side of the SLTE in the local station from the monitoring system. The optical power measurement value of the wavelength slot of the same wavelength as the designated wavelength measured by the optical spectrum measurement function of the OCM on the transmitting side is checked, and presence or absence of an optical signal on the transmitting side of the SLTE is monitored. Then, transponder wavelength information and dummy optical wavelength information about the opposed station are transmitted to the OCM on the receiving side of the SLTE in the local station, the optical power measurement value of the wavelength slot of the same wavelength as the designated wavelength measured by the optical spectrum measurement function of the OCM on the receiving side is checked. Thus, presence or absence of an optical signal on the receiving side of the SLTE is monitored.

In an optical signal monitor means according to another example embodiment when a photodetector (PD) is used instead of the OCM on the transmitting side of the SLTE, powers of the transponder and dummy light are measured by the PD at the MUX input port, and therefore, presence or absence of an optical signal on the transmitting side of the SLTE is monitored. The PD and the transponder wavelength information are associated on a one-to-one basis by the monitoring system. Further, transponder wavelength information and dummy optical wavelength information about the opposed station are transmitted to the OCM on the receiving side of the SLTE in the local station, and the optical power measurement value of the wavelength slot of the same wavelength as the designated wavelength measured by the optical spectrum measurement function of the OCM on the receiving side is checked. Thus, presence or absence of an optical signal on the receiving side of the SLTE is monitored.

Further, in an optical signal monitor means according to still another example embodiment when another transponder supplier, which is not subordinate to the monitoring system of the original supplier, expands the wavelength, transponder wavelength information (filter wavelength information) is transmitted to each of the MUX and the OCM on the transmitting side of the SLTE in the local station from the monitoring system of the original supplier. The optical power measurement value of the wavelength slot of the same wavelength as the designated wavelength measured by the optical spectrum measurement function of the OCM on the transmitting side is checked, and presence or absence of an optical signal on the transmitting side of the SLTE is monitored. Then, transponder wavelength information (filter wavelength information) is transmitted to each of the DEMUX and the OCM on the receiving side of the SLTE in the local station, and the optical power measurement value of the wavelength slot of the same wavelength as the designated wavelength measured by the optical spectrum measurement function of the OCM on the receiving side is checked to monitor presence or absence of an optical signal on the receiving side of the SLTE. When another transponder supplier registers transponder wavelength information (filter wavelength information) in the monitoring system of the original supplier, the state of each of the active filters of the MUX and the DEMUX that transmit optical signals is shifted from a closed state to an open state, thereby making it possible to transmit an optical signal to the opposed station. By this method, information can be accurately set in the monitoring system of the original supplier even when another transponder supplier expands the wavelength, and presence or absence of an optical signal on the transmitting side and the receiving side of the SLTE can be monitored.

Further, in the method of monitoring a failure in the transmission line using the above-described three optical signal monitor means, it is possible to monitor a failure in the transmission line based on a transmission line failure condition in which one or more optical signals on the transmitting side of the SLTE are present and none of the optical signals on the receiving side of the SLTE are present.

The whole or part of the example embodiments described above can also be described as, but not limited to, the following supplementary notes. (Supplementary note 1) A monitoring system for a transmission line for transmitting an optical wavelength multiplexed signal between a local station and an opposed station, the monitoring system comprising: a first monitor means for measuring an optical power of an optical signal associated with an optical wavelength multiplexed signal transmitted by the local station; a second monitor means for measuring an optical power of an optical signal associated with an optical wavelength multiplexed signal received by the local station; and a monitoring control means for performing monitoring by transmitting transponder wavelength information and dummy optical wavelength information about the local station to the first monitor means, checking an optical power of a wavelength slot of a same wavelength as a wavelength designated in the transponder wavelength information and the dummy optical wavelength information measured by the first monitor means, also transmitting transponder wavelength information and dummy optical wavelength information about the opposed station to the second monitor means, and checking an optical power of a wavelength slot of a same wavelength as a wavelength designated in the transponder wavelength information and the dummy optical wavelength information measured by the second monitor means.

(Supplementary note 2) The monitoring system according to Supplementary note 1, further comprising:

a third monitor means for measuring an optical power of an optical wavelength multiplexed signal received by the opposed station; and a fourth monitor means for measuring an optical power of an optical wavelength multiplexed signal received by the local station. (Supplementary note 3) The monitoring system according to Supplementary note 2, in which the monitoring control means transmits transponder wavelength information and dummy optical wavelength information about the local station to the third monitor means, checks an optical power of a wavelength slot of a same wavelength as a wavelength designated in the transponder wavelength information and the dummy optical wavelength information measured by the third monitor means, also transmits transponder wavelength information and dummy optical wavelength information about the opposed station to the fourth monitor means, and checks an optical power of a wavelength slot of a same wavelength as a wavelength designated in the transponder wavelength information and the dummy optical wavelength information measured by the fourth monitor means.

(Supplementary note 4) The monitoring system according to any one of Supplementary notes 1 to 3, in which the first monitor means checks the optical power by using an optical wavelength multiplexed signal obtained by multiplexing the dummy light and an optical signal from a transponder of the local station, and the second monitor means checks the optical power by using an optical wavelength multiplexed signal obtained by multiplexing the dummy light and an optical signal from a transponder of the opposed station.

(Supplementary note 5) The monitoring system according to Supplementary note 4, further comprising a multiplexing unit that multiplexes the dummy light and an optical signal from a transponder of the local station and generates the optical wavelength multiplexed signal.

(Supplementary note 6) The monitoring system according to Supplementary note 4 or 5, further comprising a multiplexing unit that multiplexes the dummy light and an optical signal from a transponder of the opposed station and generates the optical wavelength multiplexed signal.

(Supplementary note 7) The monitoring system according to Supplementary note 5 or 6, in which the multiplexing unit includes an active filter, and the active filter is controlled to have a filter shape that transmits a signal according to the transponder wavelength information from the monitoring control means.

(Supplementary note 8) The monitoring system according to any one of Supplementary notes 1 to 3, in which the first monitor means checks the optical power by using the dummy light and an optical signal from a transponder of the local station.

(Supplementary note 9) The monitoring system according to any one of Supplementary notes 1, 2, 3, and 8, in which the second monitor means checks the optical power by using an optical wavelength multiplexed signal obtained by multiplexing the dummy light and an optical signal from a transponder of the opposed station.

(Supplementary note 10) A monitoring method for a transmission line for transmitting an optical wavelength multiplexed signal between a local station and an opposed station, the monitoring method comprising: transmitting transponder wavelength information and dummy optical wavelength information about the local station to a first monitor means for measuring an optical power of an optical signal associated with an optical wavelength multiplexed signal transmitted by the local station, and checking an optical power of a wavelength slot of a same wavelength as a wavelength designated in the transponder wavelength information and the dummy optical wavelength information measured by the first monitor means; and transmitting transponder wavelength information and dummy optical wavelength information about the opposed station to a second monitor means for measuring an optical power of an optical signal associated with an optical wavelength multiplexed signal received by the local station, and checking an optical power of a wavelength slot of a same wavelength as a wavelength designated in the transponder wavelength information and the dummy optical wavelength information measured by the second monitor means.

(Supplementary note 11) The monitoring method for the transmission line according to Supplementary note 10, further comprising: transmitting transponder wavelength information and dummy optical wavelength information about the local station to a third monitor means for measuring an optical power of an optical wavelength multiplexed signal received by the opposed station; checking an optical power of a wavelength slot of a same wavelength as a wavelength designated in the transponder wavelength information and the dummy optical wavelength information measured by the third monitor means; transmitting transponder wavelength information and dummy optical wavelength information about the opposed station to a fourth monitor means for measuring an optical power of an optical wavelength multiplexed signal received by the local station; and checking an optical power of a wavelength slot of a same wavelength as a wavelength designated in the transponder wavelength information and the dummy optical wavelength information measured by the fourth monitor means.

(Supplementary note 12) The monitoring method for the transmission line according to Supplementary note 10 or 11, in which the first monitor means checks the optical power by using an optical wavelength multiplexed signal obtained by multiplexing the dummy light and an optical signal from a transponder of the local station, and the second monitor means checks the optical power by using an optical wavelength multiplexed signal obtained by multiplexing the dummy light and an optical signal from a transponder of the opposed station.

(Supplementary note 13) The monitoring method for the transmission line according to Supplementary note 10 or 11, in which the first monitor means checks the optical power by using the dummy light and an optical signal from a transponder of the local station.

(Supplementary note 14) The monitoring method for the transmission line according to any one of Supplementary notes 10, 11, and 13, in which the second monitor means checks the optical power by using an optical wavelength multiplexed signal obtained by multiplexing the dummy light and an optical signal from a transponder of the opposed station.

(Supplementary note 15) A monitoring program for a transmission line for transmitting an optical wavelength multiplexed signal between a local station and an opposed station, the monitoring program causing a computer to execute: control processing for transmitting transponder wavelength information and dummy optical wavelength information about the local station to a first monitor means for measuring an optical power of an optical signal associated with an optical wavelength multiplexed signal transmitted by the local station; monitoring processing for checking an optical power of a wavelength slot of a same wavelength as a wavelength designated in the transponder wavelength information and the dummy optical wavelength information measured by the first monitor means; control processing for transmitting transponder wavelength information and dummy optical wavelength information about the opposed station to a second monitor means for measuring an optical power of an optical signal associated with an optical wavelength multiplexed signal received by the local station; and monitoring processing for checking an optical power of a wavelength slot of a same wavelength as a wavelength designated in the transponder wavelength information and the dummy optical wavelength information measured by the second monitor means.

(Supplementary note 16) The monitoring program for the transmission line according to Supplementary note 15, further causing the computer to execute: control processing for transmitting transponder wavelength information and dummy optical wavelength information about the local station to a third monitor means for measuring an optical power of an optical wavelength multiplexed signal received by the opposed station; monitoring processing for checking an optical power of a wavelength slot of a same wavelength as a wavelength designated in the transponder wavelength information and the dummy optical wavelength information measured by the third monitor means; control processing for transmitting transponder wavelength information and dummy optical wavelength information about the opposed station to a fourth monitor means for measuring an optical power of an optical wavelength multiplexed signal received by the local station; and monitoring processing for checking an optical power of a wavelength slot of a same wavelength of a wavelength designated in the transponder wavelength information and the dummy optical wavelength information measured by the fourth monitor means.

(Supplementary note 17) The monitoring program for the transmission line according to Supplementary note 15 or 16, in which the first monitor means checks the optical power by using an optical wavelength multiplexed signal obtained by multiplexing the dummy light and an optical signal from a transponder of the local station, and the second monitor means checks the optical power by using an optical wavelength multiplexed signal obtained by multiplexing the dummy light and an optical signal from a transponder of the opposed station.

(Supplementary note 18) The monitoring program for the transmission line according to Supplementary note 15 or 16, in which the first monitor means checks the optical power by using the dummy light and an optical signal from a transponder of the local station.

(Supplementary note 19) The monitoring program for the transmission line according to any one of Supplementary notes 15, 16, and 18, in which the second monitor means checks the optical power by using an optical wavelength multiplexed signal obtained by multiplexing the dummy light and an optical signal from a transponder of the opposed station.

The present invention has been described above by taking the above-described example embodiments as exemplary examples. However, the present invention is not limited to the above-described example embodiments. In other words, the present invention can apply various modes that can be understood by a person skilled in the art within the scope of the present invention.

This application is based upon and claims the benefit of priority from Japanese Patent Application No. 2016-180629, filed on Sep. 15, 2016, the disclosure of which is incorporated herein in its entirety by reference.

REFERENCE SIGNS LIST 10A, 10B SLTE
11A, 21A MUX
12A, 12B, 14A, 14B, 22A, 22B, 24A, 24B OCM
13A, 13B, 23B DEMUX
15A, 15B Optical power monitor device
19 Monitoring system
20A, 20B SLTE-a
25A, 25B SLTE-b
30 Optical relay amplifier

What is claimed is:

1. A monitoring system for a transmission line for transmitting an optical wavelength multiplexed signal between a local station and an opposed station, the monitoring system comprising:
a first monitor unit that measures an optical power of an optical signal associated with an optical wavelength multiplexed signal transmitted by the local station;
a second monitor unit that measures an optical power of an optical signal associated with an optical wavelength multiplexed signal received by the local station; and
a monitoring control unit that performs monitoring by transmitting transponder wavelength information and dummy optical wavelength information about the local station to the first monitor unit, checking an optical power of a wavelength slot of a same wavelength as a wavelength designated in the transponder wavelength information and the dummy optical wavelength information measured by the first monitor unit, also transmitting transponder wavelength information and dummy optical wavelength information about the opposed station to the second monitor unit, and checking an optical power of a wavelength slot of a same wavelength as a wavelength designated in the transponder wavelength information and the dummy optical wavelength information measured by the second monitor unit.

2. The monitoring system according to claim 1, further comprising:
a third monitor unit that measures an optical power of an optical wavelength multiplexed signal received by the opposed station; and
a fourth monitor unit that measures an optical power of an optical wavelength multiplexed signal received by the local station.

3. The monitoring system according to claim 2, wherein the monitoring control unit transmits transponder wavelength information and dummy optical wavelength information about the local station to the third monitor unit, checks an optical power of a wavelength slot of a same wavelength as a wavelength designated in the transponder wavelength information and the dummy optical wavelength information measured by the third monitor unit, also transmits transponder wavelength information and dummy optical wavelength information about the opposed station to the fourth monitor unit, and checks an optical power of a wavelength slot of a same wavelength as a wavelength designated in the transponder wavelength information and the dummy optical wavelength information measured by the fourth monitor unit.

4. The monitoring system according to claim 1, wherein the first monitor unit checks the optical power by using an optical wavelength multiplexed signal obtained by multiplexing the dummy light and an optical signal from a transponder of the local station, and the second monitor unit checks the optical power by using an optical wavelength multiplexed signal obtained by multiplexing the dummy light and an optical signal from a transponder of the opposed station.

5. The monitoring system according to claim 4, further comprising a multiplexing unit that multiplexes the dummy light and an optical signal from a transponder of the local station and generates the optical wavelength multiplexed signal.

6. The monitoring system according to claim 4, further comprising a multiplexing unit that multiplexes the dummy light and an optical signal from a transponder of the opposed station and generates the optical wavelength multiplexed signal.

7. The monitoring system according to claim 5, wherein the multiplexing unit includes an active filter, and the active filter is controlled to have a filter shape that transmits a signal according to the transponder wavelength information from the monitoring control unit.

8. The monitoring system according to claim 1, wherein the first monitor unit checks the optical power by using the dummy light and an optical signal from a transponder of the local station.

9. The monitoring system according to claim 1, wherein the second monitor unit checks the optical power by using an optical wavelength multiplexed signal obtained by multiplexing the dummy light and an optical signal from a transponder of the opposed station.

10. A monitoring method for a transmission line for transmitting an optical wavelength multiplexed signal between a local station and an opposed station, the monitoring method comprising:
   transmitting transponder wavelength information and dummy optical wavelength information about the local station to a first monitor unit that measures an optical power of an optical signal associated with an optical wavelength multiplexed signal transmitted by the local station, and checking an optical power of a wavelength slot of a same wavelength as a wavelength designated in the transponder wavelength information and the dummy optical wavelength information measured by the first monitor unit; and
   transmitting transponder wavelength information and dummy optical wavelength information about the opposed station to a second monitor unit that measures an optical power of an optical signal associated with an optical wavelength multiplexed signal received by the local station, and checking an optical power of a wavelength slot of a same wavelength as a wavelength designated in the transponder wavelength information and the dummy optical wavelength information measured by the second monitor unit.

11. The monitoring method for the transmission line according to claim 10, further comprising:
   transmitting transponder wavelength information and dummy optical wavelength information about the local station to a third monitor unit that measures an optical power of an optical wavelength multiplexed signal received by the opposed station;
   checking an optical power of a wavelength slot of a same wavelength as a wavelength designated in the transponder wavelength information and the dummy optical wavelength information measured by the third monitor unit;
   transmitting transponder wavelength information and dummy optical wavelength information about the opposed station to a fourth monitor unit that measures an optical power of an optical wavelength multiplexed signal received by the local station; and
   checking an optical power of a wavelength slot of a same wavelength as a wavelength designated in the transponder wavelength information and the dummy optical wavelength information measured by the fourth monitor unit.

12. The monitoring method for the transmission line according to claim 10, wherein the first monitor unit checks the optical power by using an optical wavelength multiplexed signal obtained by multiplexing the dummy light and an optical signal from a transponder of the local station, and
   the second monitor unit checks the optical power by using an optical wavelength multiplexed signal obtained by multiplexing the dummy light and an optical signal from a transponder of the opposed station.

13. The monitoring method for the transmission line according to claim 10, wherein the first monitor unit checks the optical power by using the dummy light and an optical signal from a transponder of the local station.

14. The monitoring method for the transmission line according to claim 10, wherein the second monitor unit checks the optical power by using an optical wavelength multiplexed signal obtained by multiplexing the dummy light and an optical signal from a transponder of the opposed station.

15. A non-transitory computer-readable recording medium to record monitoring program for a transmission line for transmitting an optical wavelength multiplexed signal between a local station and an opposed station,
   the monitoring program causing a computer to execute:
   control processing for transmitting transponder wavelength information and dummy optical wavelength information about the local station to a first monitor means for measuring an optical power of an optical signal associated with an optical wavelength multiplexed signal transmitted by the local station;
   monitoring processing for checking an optical power of a wavelength slot of a same wavelength as a wavelength designated in the transponder wavelength information and the dummy optical wavelength information measured by the first monitor means;
   control processing for transmitting transponder wavelength information and dummy optical wavelength information about the opposed station to a second monitor means for measuring an optical power of an optical signal associated with an optical wavelength multiplexed signal received by the local station; and
   monitoring processing for checking an optical power of a wavelength slot of a same wavelength as a wavelength designated in the transponder wavelength information and the dummy optical wavelength information measured by the second monitor means.

16. The non-transitory computer-readable recording medium to record monitoring program for the transmission line according to claim 15, further causing the computer to execute:
   control processing for transmitting transponder wavelength information and dummy optical wavelength information about the local station to a third monitor means for measuring an optical power of an optical wavelength multiplexed signal received by the opposed station;
   monitoring processing for checking an optical power of a wavelength slot of a same wavelength as a wavelength designated in the transponder wavelength information and the dummy optical wavelength information measured by the third monitor means;
   control processing for transmitting transponder wavelength information and dummy optical wavelength information about the opposed station to a fourth monitor means for measuring an optical power of an optical wavelength multiplexed signal received by the local station; and monitoring processing for checking an optical power of a wavelength slot of a same wavelength of a wavelength designated in the transponder wavelength information and the dummy optical wavelength information measured by the fourth monitor means.

17. The non-transitory computer-readable recording medium to record monitoring program for the transmission line according to claim 15, wherein the first monitor means checks the optical power by using an optical wavelength multiplexed signal obtained by multiplexing the dummy light and an optical signal from a transponder of the local station, and the second monitor means checks the optical power by using an optical wavelength multiplexed signal obtained by multiplexing the dummy light and an optical signal from a transponder of the opposed station.

18. The non-transitory computer-readable recording medium to record monitoring program for the transmission line according claim 15, wherein the first monitor means checks the optical power by using the dummy light and an optical signal from a transponder of the local station.

19. The non-transitory computer-readable recording medium to record monitoring program for the transmission line according claim 15, wherein the second monitor means checks the optical power by using an optical wavelength multiplexed signal obtained by multiplexing the dummy light and an optical signal from a transponder of the opposed station.

* * * * *